United States Patent
Jones et al.

(10) Patent No.: US 12,443,251 B2
(45) Date of Patent: Oct. 14, 2025

(54) FAULT MANAGED POWER IN A POWER DISTRIBUTION UNIT

(71) Applicant: Cisco Technology, Inc., San Jose, CA (US)

(72) Inventors: Chad M. Jones, Doylestown, OH (US); Jason Dewayne Potterf, Austin, TX (US); Joel Richard Goergen, Soulsbyville, CA (US); Elizabeth Kochuparambil, Morgan Hill, CA (US); Douglas Paul Arduini, Florence, OR (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 250 days.

(21) Appl. No.: 18/360,134

(22) Filed: Jul. 27, 2023

(65) Prior Publication Data
US 2025/0038494 A1    Jan. 30, 2025

(51) Int. Cl.
*G06F 1/18*     (2006.01)
*H05K 7/14*     (2006.01)

(52) U.S. Cl.
CPC .......... *G06F 1/189* (2013.01); *H05K 7/1492* (2013.01)

(58) Field of Classification Search
CPC ..... H05K 7/1457; H05K 7/1492; G06F 1/189
See application file for complete search history.

(56) References Cited

U.S. PATENT DOCUMENTS

| | | |
|---|---|---|
| 3,335,324 A | 8/1967 | Buckeridge |
| 4,811,187 A | 3/1989 | Nakajima et al. |

(Continued)

FOREIGN PATENT DOCUMENTS

| | | |
|---|---|---|
| CN | 1209880 C | 7/2005 |
| CN | 201689347 U | 12/2010 |

(Continued)

OTHER PUBLICATIONS

Adapa, R., et al., "Dynamic Thermal Rating of Substation Terminal Equipment," CIGRE, https://www.researchgate.net/publication/228453727_Dynamic_Thermal_Rating_of_Substation_Terminal_Equipment, Jan. 2004, 8 pages.

(Continued)

*Primary Examiner* — Robert J Hoffberg
(74) *Attorney, Agent, or Firm* — Edell, Shapiro & Finnan, LLC

(57) ABSTRACT

A power distribution unit (PDU) includes a housing configured to be mounted into or on a rack that has a plurality of shelf positions for a variety of computing equipment, networking equipment or data storage equipment. The PDU includes power inputs. The power inputs are configured to receive one or more of: alternating current (AC) power, high voltage direct current (DC) power, single-phase fault managed power, or multi-phase fault managed power. The PDU further includes at least one fault managed power module configured to be contained in the housing, the at least one fault managed power module including a power transmitter configured to generate single-phase or multi-phase fault managed power from the AC power and/or high voltage DC power. The PDU also includes a plurality of connectors on the housing and configured to provide cable connections to one or more of the plurality of shelf positions of the rack.

20 Claims, 6 Drawing Sheets

(56) References Cited

U.S. PATENT DOCUMENTS

| | | | |
|---|---|---|---|
| 5,652,893 A | 7/1997 | Ben-Meir et al. | |
| 5,793,628 A | 8/1998 | Koch | |
| 6,008,631 A | 12/1999 | Johari | |
| 6,220,955 B1 | 4/2001 | Posa | |
| 6,229,691 B1* | 5/2001 | Tanzer | H01R 25/006 |
| | | | 439/534 |
| 6,259,745 B1 | 7/2001 | Chan | |
| 6,482,046 B1* | 11/2002 | Salinas | H01R 13/506 |
| | | | 439/923 |
| 6,498,716 B1* | 12/2002 | Salinas | G06F 1/189 |
| | | | 439/341 |
| 6,636,538 B1 | 10/2003 | Stephens | |
| 6,685,364 B1 | 2/2004 | Brezina et al. | |
| 6,784,790 B1 | 8/2004 | Lester | |
| 6,826,368 B1 | 11/2004 | Koren et al. | |
| 6,855,881 B2 | 2/2005 | Khoshnood | |
| 6,860,004 B2 | 3/2005 | Hirano et al. | |
| 7,325,150 B2 | 1/2008 | Lehr et al. | |
| 7,420,355 B2 | 9/2008 | Liu et al. | |
| 7,490,996 B2 | 2/2009 | Sommer | |
| 7,492,059 B2 | 2/2009 | Peker et al. | |
| 7,509,505 B2 | 3/2009 | Randall et al. | |
| 7,566,987 B2 | 7/2009 | Black et al. | |
| 7,583,703 B2 | 9/2009 | Bowser et al. | |
| 7,589,435 B2 | 9/2009 | Metsker et al. | |
| 7,593,747 B1 | 9/2009 | Karam et al. | |
| 7,603,570 B2 | 10/2009 | Schindler et al. | |
| 7,616,465 B1 | 11/2009 | Vinciarelli | |
| 7,813,646 B2 | 10/2010 | Furey | |
| 7,835,389 B2 | 11/2010 | Yu et al. | |
| 7,854,634 B2 | 12/2010 | Filipon et al. | |
| 7,881,072 B2 | 2/2011 | Dibene, II et al. | |
| 7,915,761 B1 | 3/2011 | Jones et al. | |
| 7,921,307 B2 | 4/2011 | Karam et al. | |
| 7,924,579 B2 | 4/2011 | Arduini | |
| 7,940,787 B2 | 5/2011 | Karam | |
| 7,973,538 B2 | 7/2011 | Karam | |
| 8,020,043 B2 | 9/2011 | Karam | |
| 8,037,324 B2 | 10/2011 | Hussain | |
| 8,081,589 B1 | 12/2011 | Gilbrech et al. | |
| 8,184,525 B2 | 5/2012 | Karam | |
| 8,276,397 B1 | 10/2012 | Carlson et al. | |
| 8,279,883 B2 | 10/2012 | Diab et al. | |
| 8,310,089 B2 | 11/2012 | Schindler et al. | |
| 8,319,627 B2 | 11/2012 | Chan et al. | |
| 8,345,439 B1 | 1/2013 | Goergen et al. | |
| 8,350,538 B2 | 1/2013 | Cuk | |
| 8,358,893 B1 | 1/2013 | Sanderson et al. | |
| 8,400,765 B2* | 3/2013 | Ross | H05K 7/20836 |
| | | | 360/99.18 |
| 8,416,565 B1* | 4/2013 | Ross | H05K 7/1492 |
| | | | 345/173 |
| 8,472,183 B1* | 6/2013 | Ross | H05K 7/20736 |
| | | | 361/679.48 |
| 8,477,491 B1* | 7/2013 | Ross | H05K 7/20736 |
| | | | 361/679.48 |
| 8,638,008 B2 | 1/2014 | Baldwin et al. | |
| 8,700,923 B2 | 4/2014 | Fung | |
| 8,712,324 B2 | 4/2014 | Corbridge et al. | |
| 8,750,710 B1 | 6/2014 | Hirt et al. | |
| 8,768,528 B2 | 7/2014 | Millar et al. | |
| 8,781,637 B2 | 7/2014 | Eaves | |
| 8,787,775 B2 | 7/2014 | Earnshaw | |
| 8,829,917 B1 | 9/2014 | Lo et al. | |
| 8,836,228 B2 | 9/2014 | Xu et al. | |
| 8,842,430 B2 | 9/2014 | Hellriegel et al. | |
| 8,849,471 B2 | 9/2014 | Daniel et al. | |
| 8,966,747 B2 | 3/2015 | Vinciarelli et al. | |
| 9,019,895 B2 | 4/2015 | Li et al. | |
| 9,024,473 B2 | 5/2015 | Huff et al. | |
| 9,184,795 B2 | 11/2015 | Eaves | |
| 9,189,036 B2 | 11/2015 | Ghoshal et al. | |
| 9,189,043 B2 | 11/2015 | Vorenkamp et al. | |
| 9,201,486 B2 | 12/2015 | Jagadishprasad et al. | |
| 9,273,906 B2 | 3/2016 | Goth et al. | |
| 9,282,660 B2* | 3/2016 | Bailey | H05K 7/1491 |
| 9,319,101 B2 | 4/2016 | Lontka | |
| 9,321,362 B2 | 4/2016 | Woo et al. | |
| 9,373,963 B2 | 6/2016 | Kuznetsov | |
| 9,419,436 B2 | 8/2016 | Eaves et al. | |
| 9,455,937 B2 | 9/2016 | Goergen | |
| 9,510,479 B2 | 11/2016 | Vos | |
| 9,531,551 B2 | 12/2016 | Balasubramanian et al. | |
| 9,590,811 B2 | 3/2017 | Hunter, Jr. et al. | |
| 9,618,714 B2 | 4/2017 | Murray | |
| 9,640,998 B2 | 5/2017 | Dawson | |
| 9,665,148 B2 | 5/2017 | Hamdi et al. | |
| 9,693,244 B2 | 6/2017 | Maruhashi et al. | |
| 9,734,940 B1 | 8/2017 | McNutt et al. | |
| 9,853,689 B2 | 12/2017 | Eaves | |
| 9,874,930 B2 | 1/2018 | Vavilala et al. | |
| 9,882,656 B2 | 1/2018 | Sipes, Jr. et al. | |
| 9,893,521 B2 | 2/2018 | Lowe et al. | |
| 9,948,198 B2 | 4/2018 | Imai | |
| 9,979,370 B2 | 5/2018 | Xu | |
| 9,985,600 B2 | 5/2018 | Xu et al. | |
| 10,007,628 B2 | 6/2018 | Pitigoi-Aron et al. | |
| 10,028,417 B2 | 7/2018 | Schmidtke et al. | |
| 10,128,764 B1 | 11/2018 | Vinciarelli | |
| 10,248,178 B2 | 4/2019 | Brooks et al. | |
| 10,263,526 B2 | 4/2019 | Sandusky et al. | |
| 10,407,995 B2 | 9/2019 | Moeny | |
| 10,439,432 B2 | 10/2019 | Eckhardt et al. | |
| 10,541,543 B2 | 1/2020 | Eaves | |
| 10,541,758 B2 | 1/2020 | Goergen et al. | |
| 10,595,433 B2* | 3/2020 | Chen | H05K 7/1492 |
| 10,631,443 B2 | 4/2020 | Byers et al. | |
| 10,672,537 B2 | 6/2020 | Goergen et al. | |
| 10,732,688 B2 | 8/2020 | Goergen et al. | |
| 10,735,105 B2 | 8/2020 | Goergen et al. | |
| 10,809,134 B2 | 10/2020 | Bullock et al. | |
| 10,958,471 B2 | 3/2021 | Goergen et al. | |
| 11,258,520 B2 | 2/2022 | Goergen et al. | |
| 11,438,183 B2* | 9/2022 | Goergen | G06F 1/26 |
| 11,582,048 B2* | 2/2023 | Goergen | H04L 12/10 |
| 11,630,497 B2 | 4/2023 | Jones et al. | |
| 11,894,936 B2* | 2/2024 | Goergen | H04L 12/2885 |
| 2001/0024373 A1 | 9/2001 | Cuk | |
| 2002/0126967 A1 | 9/2002 | Panak et al. | |
| 2004/0000816 A1 | 1/2004 | Khoshnood | |
| 2004/0033076 A1 | 2/2004 | Song et al. | |
| 2004/0043651 A1 | 3/2004 | Bain et al. | |
| 2004/0073703 A1 | 4/2004 | Boucher et al. | |
| 2004/0264214 A1 | 12/2004 | Xu et al. | |
| 2005/0197018 A1 | 9/2005 | Lord | |
| 2005/0268120 A1 | 12/2005 | Schindler et al. | |
| 2006/0171439 A1 | 8/2006 | Ferentz et al. | |
| 2006/0202109 A1 | 9/2006 | Delcher et al. | |
| 2006/0209875 A1 | 9/2006 | Lum et al. | |
| 2007/0103168 A1 | 5/2007 | Batten et al. | |
| 2007/0132487 A1 | 6/2007 | Kestelli | |
| 2007/0236853 A1 | 10/2007 | Crawley | |
| 2007/0263675 A1 | 11/2007 | Lum et al. | |
| 2007/0284946 A1 | 12/2007 | Robbins | |
| 2007/0288125 A1 | 12/2007 | Quaratiello | |
| 2008/0168283 A1 | 7/2008 | Penning | |
| 2008/0198635 A1 | 8/2008 | Hussain et al. | |
| 2008/0229120 A1 | 9/2008 | Diab | |
| 2008/0235523 A1 | 9/2008 | Hussain | |
| 2008/0310067 A1 | 12/2008 | Diab et al. | |
| 2010/0077239 A1 | 3/2010 | Diab et al. | |
| 2010/0103943 A1 | 4/2010 | Walter | |
| 2010/0117808 A1 | 5/2010 | Karam | |
| 2010/0171602 A1 | 7/2010 | Kabbara et al. | |
| 2010/0190384 A1 | 7/2010 | Lanni | |
| 2010/0237846 A1 | 9/2010 | Vetteth | |
| 2010/0290190 A1 | 11/2010 | Chester et al. | |
| 2011/0004773 A1 | 1/2011 | Hussain et al. | |
| 2011/0007664 A1 | 1/2011 | Diab et al. | |
| 2011/0083824 A1 | 4/2011 | Rogers | |
| 2011/0228578 A1 | 9/2011 | Serpa et al. | |
| 2011/0266867 A1 | 11/2011 | Schindler et al. | |
| 2011/0290497 A1 | 12/2011 | Stenevik | |

(56) References Cited

U.S. PATENT DOCUMENTS

| | | |
|---|---|---|
| 2012/0064745 A1 | 3/2012 | Ottliczky |
| 2012/0170927 A1 | 7/2012 | Huang et al. |
| 2012/0201089 A1 | 8/2012 | Barth et al. |
| 2012/0231654 A1 | 9/2012 | Conrad |
| 2012/0317426 A1 | 12/2012 | Hunter, Jr. et al. |
| 2012/0319468 A1 | 12/2012 | Schneider et al. |
| 2013/0077923 A1 | 3/2013 | Peeters Weem et al. |
| 2013/0079633 A1 | 3/2013 | Peeters Weem et al. |
| 2013/0103220 A1 | 4/2013 | Eaves |
| 2013/0241287 A1 | 9/2013 | Hui |
| 2013/0249292 A1 | 9/2013 | Blackwell, Jr. et al. |
| 2013/0272721 A1 | 10/2013 | Van Veen et al. |
| 2014/0071602 A1* | 3/2014 | Alshinnawi .......... H05K 7/1492 361/679.02 |
| 2014/0111180 A1 | 4/2014 | Vladan et al. |
| 2014/0129850 A1 | 5/2014 | Paul |
| 2014/0218008 A1 | 8/2014 | Ewing et al. |
| 2014/0258742 A1 | 9/2014 | Chien et al. |
| 2014/0265550 A1 | 9/2014 | Milligan et al. |
| 2014/0372773 A1 | 12/2014 | Heath et al. |
| 2015/0042243 A1 | 2/2015 | Picard |
| 2015/0078740 A1 | 3/2015 | Sipes, Jr. et al. |
| 2015/0106539 A1 | 4/2015 | Leinonen et al. |
| 2015/0115741 A1 | 4/2015 | Dawson |
| 2015/0215001 A1 | 7/2015 | Eaves |
| 2015/0215131 A1 | 7/2015 | Paul et al. |
| 2015/0323968 A1 | 11/2015 | Chong et al. |
| 2015/0333918 A1 | 11/2015 | White, III |
| 2015/0340818 A1 | 11/2015 | Scherer et al. |
| 2016/0020911 A1 | 1/2016 | Sipes, Jr. et al. |
| 2016/0064938 A1 | 3/2016 | Balasubramanian et al. |
| 2016/0111877 A1 | 4/2016 | Eaves et al. |
| 2016/0118784 A1 | 4/2016 | Saxena et al. |
| 2016/0133355 A1 | 5/2016 | Glew et al. |
| 2016/0134331 A1 | 5/2016 | Eaves |
| 2016/0142217 A1 | 5/2016 | Gardner et al. |
| 2016/0197600 A1 | 7/2016 | Kuznetsov |
| 2016/0241148 A1 | 8/2016 | Kizilyalli et al. |
| 2016/0262288 A1 | 9/2016 | Chainer et al. |
| 2016/0269195 A1 | 9/2016 | Coenen et al. |
| 2016/0273722 A1 | 9/2016 | Crenshaw |
| 2016/0294500 A1 | 10/2016 | Chawgo et al. |
| 2016/0294568 A1 | 10/2016 | Chawgo et al. |
| 2016/0308683 A1 | 10/2016 | Pischl et al. |
| 2016/0352535 A1 | 12/2016 | Hiscock et al. |
| 2016/0365967 A1 | 12/2016 | Tu et al. |
| 2017/0041152 A1 | 2/2017 | Sheffield |
| 2017/0041153 A1 | 2/2017 | Picard et al. |
| 2017/0054296 A1 | 2/2017 | Daniel et al. |
| 2017/0110871 A1 | 4/2017 | Foster |
| 2017/0123466 A1 | 5/2017 | Carnevale |
| 2017/0146260 A1 | 5/2017 | Ribbich et al. |
| 2017/0155517 A1 | 6/2017 | Cao |
| 2017/0155518 A1 | 6/2017 | Yang |
| 2017/0164525 A1 | 6/2017 | Chapel et al. |
| 2017/0201076 A1* | 7/2017 | Chen .................... H05K 7/1492 |
| 2017/0214236 A1 | 7/2017 | Eaves |
| 2017/0229886 A1 | 8/2017 | Eaves |
| 2017/0234738 A1 | 8/2017 | Ross et al. |
| 2017/0244318 A1 | 8/2017 | Giuliano |
| 2017/0248976 A1 | 8/2017 | Moller et al. |
| 2017/0325320 A1 | 11/2017 | Wendt et al. |
| 2018/0024964 A1 | 1/2018 | Mao et al. |
| 2018/0053313 A1 | 2/2018 | Smith |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello et al. |
| 2018/0102604 A1 | 4/2018 | Keith et al. |
| 2018/0123360 A1 | 5/2018 | Eaves |
| 2018/0159430 A1 | 6/2018 | Albert |
| 2018/0188712 A1 | 7/2018 | Mackay |
| 2018/0191513 A1 | 7/2018 | Hess et al. |
| 2018/0254624 A1 | 9/2018 | Son |
| 2018/0313886 A1 | 11/2018 | Mlyniec et al. |
| 2019/0267804 A1 | 8/2019 | Matan et al. |
| 2019/0272011 A1 | 9/2019 | Goergen et al. |
| 2019/0280895 A1 | 9/2019 | Mather et al. |
| 2019/0363493 A1 | 11/2019 | Sironi et al. |
| 2019/0386836 A1 | 12/2019 | Gong et al. |
| 2021/0223839 A1 | 7/2021 | Goergen |
| 2022/0037844 A1 | 2/2022 | Irons et al. |
| 2022/0190528 A1 | 6/2022 | Arduini et al. |
| 2022/0329448 A1 | 10/2022 | Goergen et al. |
| 2023/0107008 A1 | 4/2023 | Goergen et al. |
| 2023/0378741 A1* | 11/2023 | Bolouri-Saransar ..... H03K 3/01 |
| 2023/0378805 A1* | 11/2023 | Bolouri-Saransar ........................ H02M 1/0041 |
| 2023/0378938 A1* | 11/2023 | Bolouri-Saransar ........................ H02M 11/00 |
| 2024/0334639 A1* | 10/2024 | Weber .................... F16M 13/02 |

FOREIGN PATENT DOCUMENTS

| | | |
|---|---|---|
| CN | 204836199 U | 12/2015 |
| CN | 205544597 U | 8/2016 |
| CN | 104081237 B | 10/2016 |
| CN | 104412541 B | 5/2019 |
| EP | 1936861 A1 | 6/2008 |
| EP | 2120443 A1 | 11/2009 |
| EP | 2693688 A1 | 2/2014 |
| WO | 9316407 A1 | 8/1993 |
| WO | 2010053542 A2 | 5/2010 |
| WO | 2017054030 A1 | 4/2017 |
| WO | 2017167926 A1 | 10/2017 |
| WO | 2018017544 A1 | 1/2018 |
| WO | 2019023731 A1 | 2/2019 |

OTHER PUBLICATIONS

Alexander, C.K., et al., "Fundamentals of Electric Circuits," Indian Edition, McGraw Hill Education, MATLAB Examples, Jul. 2013, 37 pages.

International Standard, "Audio/video, Information and Communication Technology Equipment—Part 1: Safety requirements," IEC 62368-1, ISBN 978-2-8322-1405-3, Edition 2.0, Feb. 2014, 680 pages.

Chen, H., et al., "Real-Time Temperature Estimation for Power MOSEFETs Considering Thermal Aging Effects," IEEE Transactions on Device and Materials Reliability, vol. 14, No. 1, Mar. 2014, 9 pages.

Chen J., et al., "Buck-boost PWM Converters Having Two Independently Controlled Switches," 32nd Annual EEE Power Electronics Specialists Conference, https://ieeexplore.ieee.org/document/954206, Jun. 2001, 6 pages.

Cheng, K.W.E., et al., "Constant Frequency, two-Stage quasiresonant convertor," IEE Proceedings B—Electric Power Applications, vol. 139, No. 3, https://research.polyu.edu.hk/en/publications/constant-frequency-two-stage-quasiresonant-convertor, May 1992, 11 pages.

Ashrae TC9.9, "Data Center Power Equipment Thermal Guidelines and Best Practices," Mission Critical Facilities, Data Centers, Technology Spaces, and Electronic Equipment, Jun. 2016, pp. 60 pages.

Eaves, S.S., "Network Remote Power using Packet Energy Transfer," Voltserver, Proceedings of IEEE International Conference on Telecommunications Energy (INTELEC), https://ieeexplore.ieee.org/document/6374488, Sep. 2012, 5 pages.

Eaves, S.S., "Network Remote Powering Using Packet Energy Transfer," 25.2, www.voltserver.com, downloaded from IEEE Xplore on Jan. 27, 2021, 4 pages.

Edelstein S., "Updated 2016 Tesla Model S also gets new 75-kWh battery option," Voltserver Exhibit 1018, retrieved from Way Back Machine, https://www.greencarreports.com/news/1103782_updated-2016-tesla-model-s-also-gets-new-75-kwh-battery-option, Feb. 6, 2021.

IEC, "Effects of Current on Human Beings and Livestock—Part 1: General Aspects," Technical Specification, Basic Safety Publication, IEC/TS 60479-1, ISBN 2-8318-8096-3, Edition 4.0, Jul. 2005, 122 pages.

(56) References Cited

OTHER PUBLICATIONS

QPC Engineered Fiber Optic Solutions, "E-Link Hybrid Connector—QPC Fiber Optic," retrieved from http://www.qpcfiber.com/product/connectors/e-link-hybrid-connector/, Dec. 21, 2017, 4 pages.

Fisher Connectors, "FiberOptic Cable and Connector Solutions," retrieved from https://www.fischerconnectors.com/us/en/products/fiberoptic, Dec. 21, 2017, 5 pages.

Hall S.H., et al., "High-Speed Digital System Design, A Handbook of Interconnect Theory and Design Practices," Voltserver Exhibit 1030, Sep. 2000, 55 Pages.

IEC, International Standard, Information Technology Equipment—Safety—Part 1: General Requirements, IEC 60950-1, Edition 2.2, ISBN 978-2-8322-0820-5, Voltserver Exhibit 1023, May 2013, 648 pages.

Juniper Networks: "Virtual Chassis Technology Best Practices," Implementation Guide, 8010018-009-EN, https://www.juniper.net/us/en/local/pdf/implementation-guides/8010018-en.pdf, Jan. 2016, 29 pages.

Lathi, B.P., et al., "Modern Digital and Analog Communication Systems," Fourth Edition, Voltserver Exhibit 1032, Jan. 2009, 15 pages.

IEC, International Standard, "Low-voltage Switchgear and Controlgear—Part 1: General Rules," Amendment 2, IEC 60947-1, Edition 5.0, ISBN 978-2-8322-1798-6, Sep. 2014, 106 pages.

Lumentum: "Power Over Fiber," https://www.lumentum.com/sites/default/files/technical-library-items/poweroverfiber-tn-pv-ae_0.pdf, Jul. 2015, 8 pages.

Microsemi, "Understanding 802.3at PoE Plus Standard Increases Available Power," Voltserver Exhibit 1033, Jun. 2011, 7 pages.

NFPA 70, "National Electrical Code," National Fire Protection Association, Voltserver Exhibit 1019, 2017 Edition, published Sep. 26, 2016, 881 pages.

Petition for Post Grant Review of U.S. Pat. No. 10,735,105 [Public] with Exhibits, PGR 2021-00055, 132 pages, Dated: Feb. 16, 2021.

Petition for Post Grant Review of U.S. Pat. No. 10,735,105 [Public] with Exhibits, PGR 2021-00056, Feb. 16, 2021, 116 pages.

Pluribus Networks, "Pluribus VirtualWire Solution," Product Overview, https://www.pluribusnetworks.com/assets/Pluribus-VirtualWire-PO-50918.pdf, May 2018, 5 pages.

Sedra, A.S., et al., "Microelectronic Circuits," Oxford University Press, Seventh Edition, Voltserver Exhibit 1031, Jan. 2015, 38 pages.

Stallings, W., "Data and Computer Communications," Macmillan Publishing Company, Fourth Edition, Voltserver Exhibit 1028, Jan. 1994, 14 pages.

Stran Technologies: "TFOCA GenX Hybrid 2x2 Fiber Optic—Copper Connector," retrieved from https://www.strantech.com/products/tfoca-genx-hybrid-2x2-fiber-optic-copper-connector/, Dec. 21, 2017, 2 pages.

Tanenbaum, A.S., "Computer Networks," Third Edition, Prentice Hall PTR, Voltserver Exhibit 1027, Mar. 1996, 12 pages.

Yencheck, M.R., et al., "Thermal Modeling of Portable Power Cables," https://www.osti.gov/biblio/6324650, Jan. 1993, 24 pages.

Zhang, K., et al., "Machine Learning-Based Temperature Prediction for Runtime Thermal Management across System Components," IEEE Transactions on Parallel and Distribute, Mar. 2016, 15 pages.

\* cited by examiner

FAULT MANAGED POWER IN A POWER DISTRIBUTION UNIT

TECHNICAL FIELD

The present disclosure relates to power distribution devices.

BACKGROUND

Fault Managed Power (FMP) techniques have typically been employed for power transmission on a cable over distances between a power transmitter and a power receiver, typically many meters. There is a desire to provide FMP functionality in industry-accepted form factors that add modular adaptability, and for much more localized distribution, such as in a rack.

DESCRIPTION OF EXAMPLE EMBODIMENTS

Overview

A power distribution apparatus is presented herein. The power distribution apparatus or power distribution unit (PDU) includes a housing configured to be mounted into or on a rack that has a plurality of shelf positions for a variety of computing equipment, networking equipment or data storage equipment. The PDU includes power inputs. The power inputs are configured to receive one or more of (a) alternating current (AC) power, (b) high voltage direct current (DC) power or (c) single-phase or multi-phase fault managed power. The PDU further includes at least one fault managed power module configured to be contained in the housing, the at least one fault managed power module including a power transmitter configured to generate single-phase or multi-phase fault managed power from the AC power and/or high voltage DC power. The PDU also includes a plurality of connectors on the housing and configured to provide cable connections to one or more of the plurality of shelf positions of the rack for one or more of: AC power, high voltage DC power, lower voltage DC power, or single-phase or multi-phase fault managed power.

Example Embodiments

Figure 1:
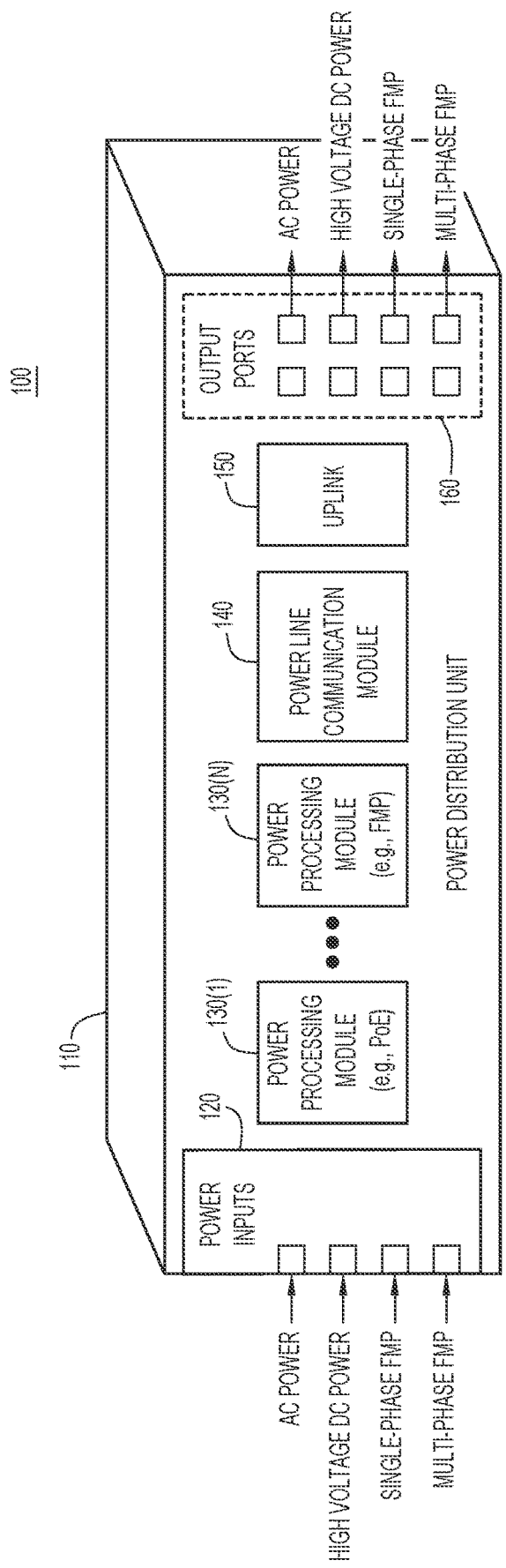
FIG. 1 is a block diagram of a power distribution unit configured to distribute power, including fault managed power, in a rack unit deployment, in accordance with an example embodiment.

Reference is first made to FIG. 1, which shows a block diagram of a power distribution unit (PDU) 100 in accordance with an example embodiment. The PDU 100 includes a housing 110 that contains various components and supports various ports/connectors. The PDU 100 includes one or more power inputs 120 coupled to/on the housing 110, one or more power processing modules 130(1)-130(N), a power line communication (PLC) module 140, an uplink 150 and a plurality of output ports 160 on the housing 110. The PLC module 140 enables communication of data on a conductor that is also used simultaneously for AC electric power transmission or electric power distribution.

Some of the output ports 160 may be physically proximate the respective power processing modules 130(1)-130(N) and PLC module 140, but for simplicity the output ports 160 are shown aggregated together. As an example, some of the output ports 160 support fault managed power and data (e.g., 10 Mb of data).

The power inputs 120 may be configured to receive one or more of: alternating current (AC) power, high voltage direct current (DC) power, single-phase fault managed power (FMP), or multi-phase FMP. In one example, the power input sources may include the 415/239V AC rack power, at 100 amps and 54 kW, or at 50 amps and 27 kW, where 54 kW and 27 kW are the maximum load for such circuits based on the U.S. National Electrical Code (NEC). Specifically, For 415 VAC at 100 amps, three phase power, 415*100*sqrt(3)=71 kW, but the NEC requires powering to only 80% of the load, which is 57.5 kW (54kW is safely less than that). For 415V at 50 amps, the maximum load allowed on that circuit is 27 kW.

"FMP" refers to power that is provided in a manner such that it can be interrupted or terminated in the event that a fault is detected on the line over which the power is being transmitted/delivered. In one example implementation of FMP, a power transmitter (in a power processing module of the PDU 100) provides electrical power to a power receiver in a destination device. The power transmitter, power receiver or both the power transmitter and power receive may be configured to detect a fault on the line carrying the power between them, and cause the power to be interrupted or terminated over the line.

At least one of the power processing modules 130(1)-130(N) may be configured to provide fault managed power, as shown in FIG. 1. As will be described below, the at least one fault managed power module, e.g., power processing module 130(N), includes a power transmitter configured to generate single-phase or multi-phase fault managed power from the AC power and/or high voltage DC power that is input to the PDU 100.

As shown in FIG. 1, the output ports 160 are configured to provide cable connections to one or more of the plurality of shelf positions of a rack for one or more of: AC power, high voltage DC power, lower voltage DC power, single-phase fault managed power, or multi-phase fault managed power.

Thus, the PDU 100 may be configured to receive as input AC power and create fault managed power for distribution to various devices in a rack, for example. The space in the PDU 100 that is normally not used is employed to integrate fault managed power capabilities spread that capability throughout the PDU 100.

As alluded to above, the PDU 100 may be configured to distribute fault managed power throughout a rack, which is not heretofore known. FMP has been primarily used for a box-to-box power transmission technology targeted for longer distances (many meters, e.g., 5-15 or more meters) using external cables. Integrating FMP capability in a PDU solves a different problem where the power is for local use. For example, the PDU 100 is configured for distributing power in a server/blade rack there the distances are typically approximately 84 inches in height, 36-42 inches in depth and 19 inches in width.

As explained above, the input to the PDU 100 could be AC power, or high voltage DC power that gets adjusted down inside the box to do FMP. When high(er) voltage DC power is provided as an input to the PDU 100, the one or more power processing modules 130(1)-130(N) include the capability to step/adjust that voltage down, which reduces safety issues. That is, if higher voltage is needed for some applications, providing the higher voltage with FMP allows providing such higher voltage power with safety. Alternatively, or in addition, the input to the PDU 100 may be fault managed power (single-phase or multi-phase) and then one of the power processing modules 130(1)-130(N) in the PDU 100 includes an inverter to output AC power to devices or raw DC power.

Figure 2:
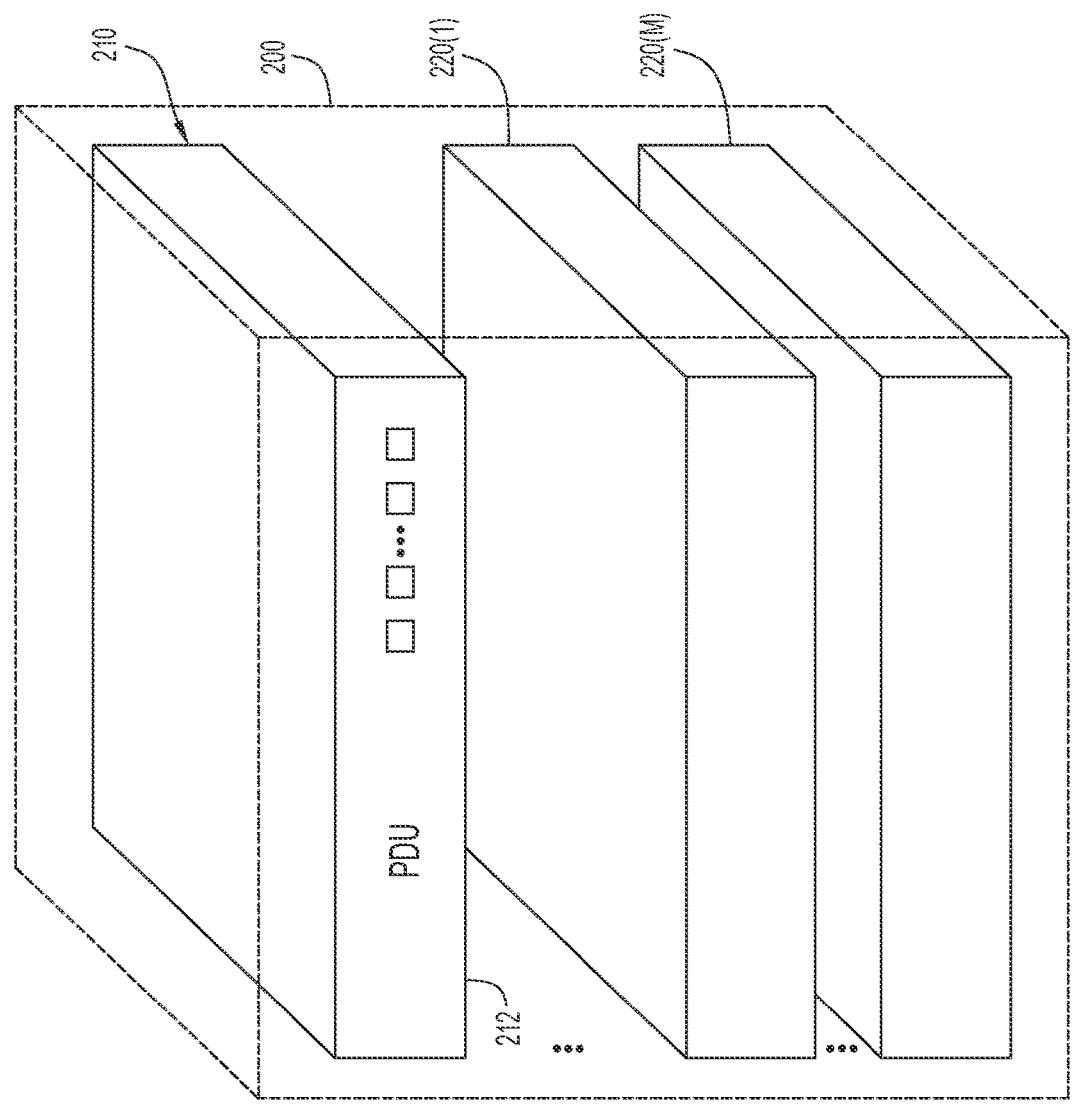
FIG. 2 is a diagram depicting the power distribution unit in a horizontal blade-like form factor and deployed in a shelf of a rack, according to an example embodiment.

The housing 110 of the PDU 100 may be configured to horizontally mount in one of the plurality of shelfs of a rack. To this end, reference is made to FIG. 2. FIG. 2 shows a rack 200 in which a PDU 210 (that is similar in configuration to the PDU 100 shown in FIG. 1) contained within housing 212 is deployed in a shelf of the rack. In one example, the PDU 210 is deployed in a top-of-rack shelf, but that is only an example, and the PDU 210 could be deployed in a middle-of-rack or bottom-of-rack shelf position in the rack 200. The PDU 210 provides power (and optionally data) to devices 220(1)-220(M) in the other shelf positions of the rack 200. For simplicity, the cable connections from the PDU 210 to the devices 220(1)-220(M) are not shown in FIG. 2.

Figure 3:
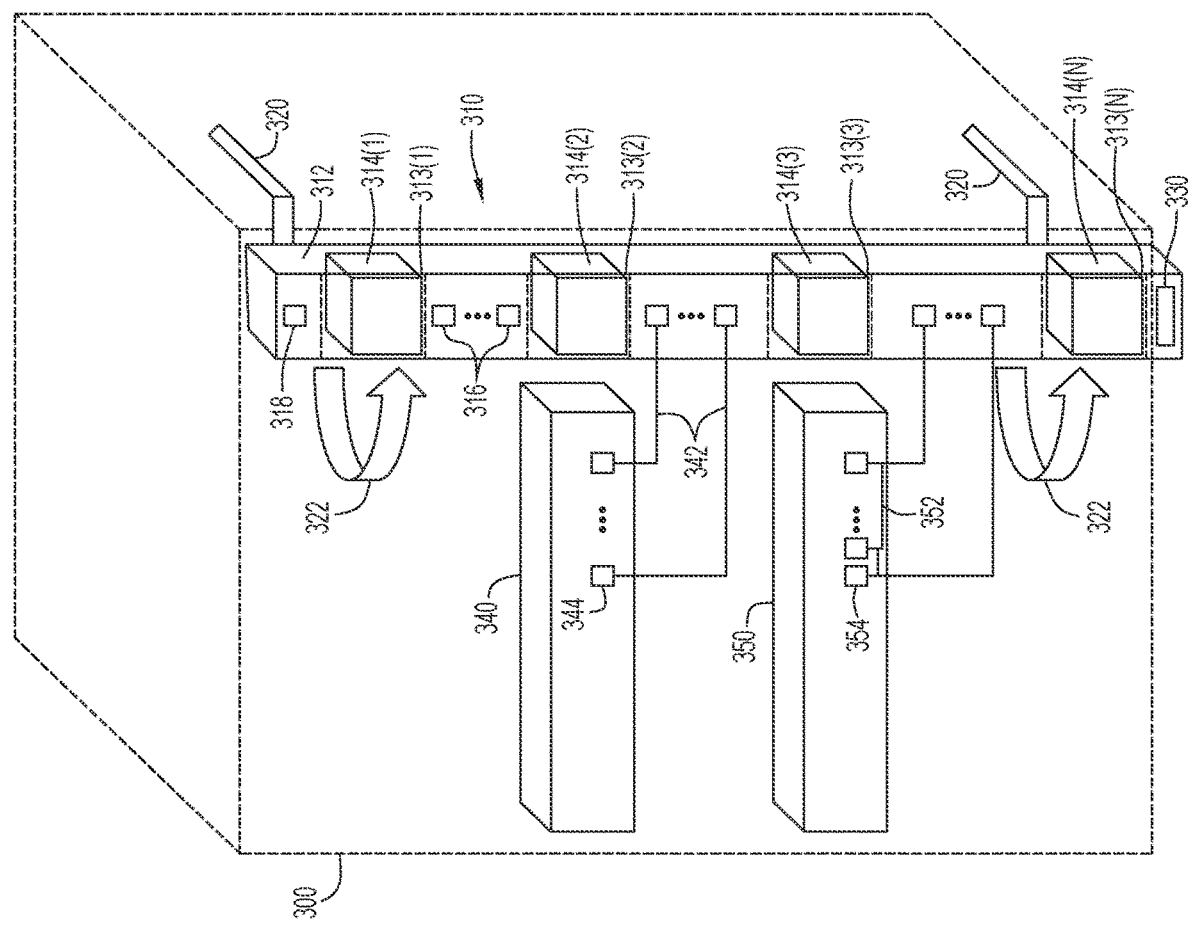
FIG. 3 is a diagram depicting the power distribution unit in a vertical power strip or bus bar form factor and deployed in a rack, according to an example embodiment.

In still another example, the PDU may be deployed as a vertical bar or power strip that is mounted or hung at the rear of a rack, in a so-called zero RU form factor. Reference is now made to FIG. 3, which is a rear view of a rack 300 in which a PDU 310 (having a configuration similar to PDU 100 shown in FIG. 1) is deployed in a vertical bus bar (or power strip) arrangement. The PDU 310 may extend the height of the rack 300 (e.g., 84 inches) and distribute power to less than a 7 foot span. The PDU 310 is contained with a housing 312 along with power processing modules 314(1), 314(2), 314(3), . . . , 314(N). The housing 312 may be embodied as a bus bar to which the power processing modules 314(1)-314(N) removably installed. There are output ports 316 arranged along the housing 312. One or more uplink ports 318 may be deployed at the top of the housing 312 to provide uplink connectivity to the PDU 310. The housing 312 may be attached to the rear of the rack 300 by swing brackets 320 that allow the PDU 310 to swing out to facilitate access to it, as shown by arrows 322. The dimensions of the housing 312 may vary, but in one example, it may be 2-3 inches wide, 6 inches deep, and approximately 80 inches high.

In one form, the housing 312 has a plurality of module positions 313(1), 313(2), 313(3), . . . , 313(N). Each module position is configured to removably receive one of the power processing modules 314(1)-314(N), such as by a plug-in connection arrangement. Examples of such suitable plug-in connection technologies that may be used for the power processing modules 314(1)-314(N) include any suitable plug-in technologies. The power processing modules 314(1)-314(N) may be factory or field programmable according to a desired power processing function, e.g., to generate single-phase or multi-phase fault managed power, to generate high voltage DC power, to generate AC power, etc. That is, the power processing modules 314(1)-314(N) may do various conversions, such AC-to-DC, AC-to-AC, FMP-to-DC, FMP-to-AC, FMP-to-FMP, FMP-to-POE, AC-to-PoE, as well as DC-to-FMP, DC-to-AC, and DC-to-DC. The housing 312 may expose power inputs 330 where input power is supplied to the PDU 310. In one example, the power inputs 330 may be positioned at the bottom of the housing 312 as shown in FIG. 3. The PDU 310 may be configured to provide output power in the aforementioned various forms in any suitable number, such as 36 ports of FMP, for example.

FIG. 3 also shows that there are connections between the PDU 310 and the devices mounted in the rack. For example, there is a device 340 on a shelf of the rack 300 and there are cable connections 342 between the output ports 316 on the PDU 310 and ports 344 on the back-panel of the device 340. In addition, there is a device 350 mounted on another shelf of the rack 300. There are wire loop connections 352 between output ports 316 and ports 354 on the back-panel of the device 350.

Figure 4:
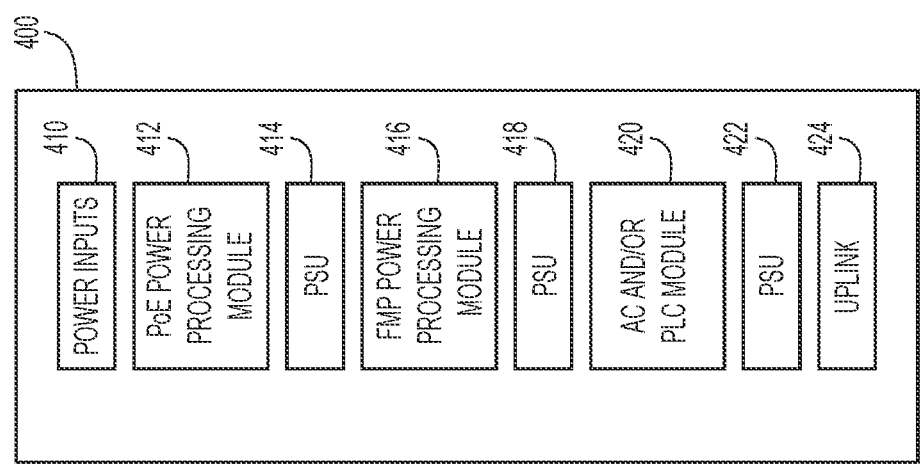
FIG. 4 is a block diagram of the power distribution unit with a plurality of vertically stacked power processing and other modules, according to an example embodiment.

Reference is now made to FIG. 4. FIG. 4 shows a depiction of an example arrangement of power processing modules and other functional blocks of a PDU 400, according to the techniques presented here. The PDU 400 has a vertically stacked arrangement of modules and blocks, such as an arrangement useful in the deployment of FIG. 3. The PDU 400 includes power inputs 410, a PoE power processing module 412, a power supply unit (PSU) 414, an FMP power processing module 416, a PSU 418, an AC and/or PLC module 420, a PSU 422, and an uplink module 424. Input power is coupled into the power inputs 410. The PoE power processing module 412 generates PoE power for transmission (with data), which may be useful for sensors and controllers. The PSUs 414, 418 and 422 provide PSU power. The FMP power processing module 416 provides fault managed power. The AC and/or PLC module provides AC or PLC communications. The uplink module 424 provides data uplink functions for the PDU 400.

Figure 5:
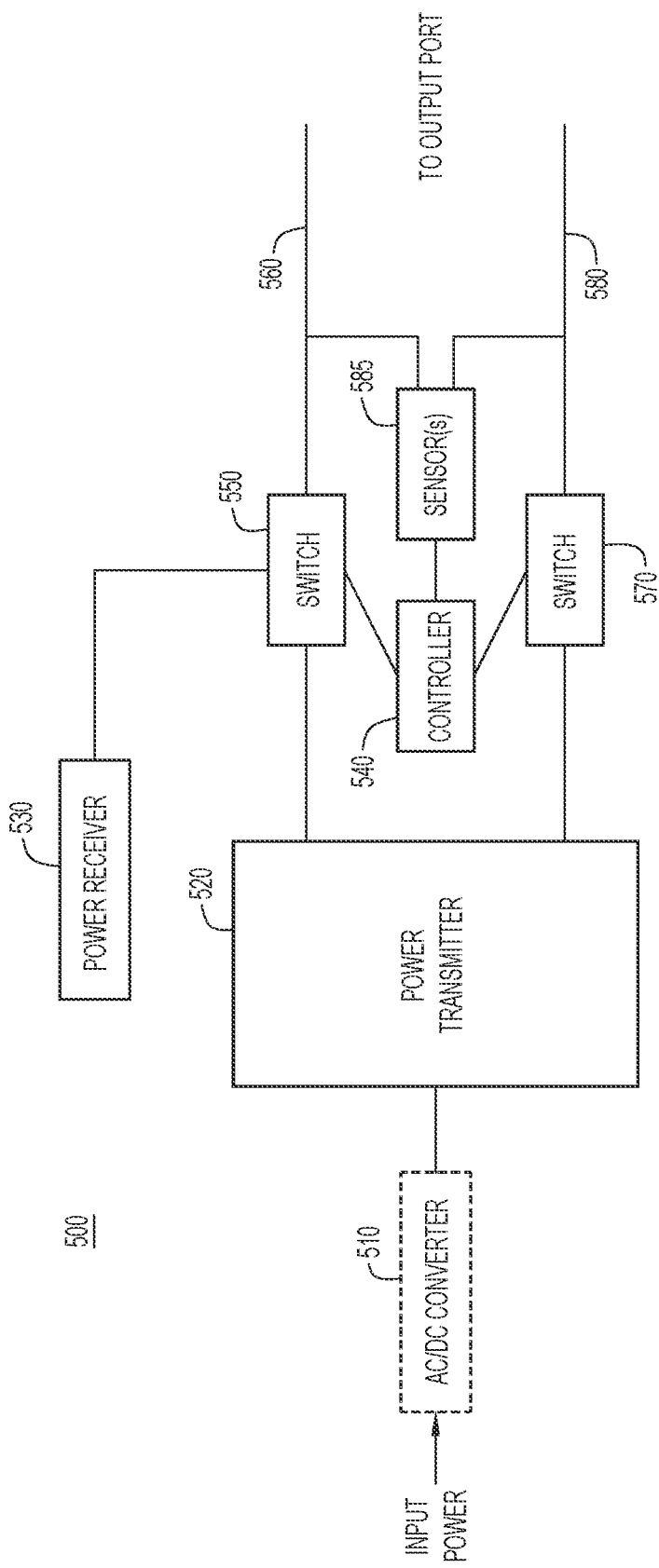
FIG. 5 is a block diagram of a fault managed power processing module that may be one of several power processing modules in the power distribution unit, according to an example embodiment.

Reference is now made to FIG. 5, which shows a block diagram of an FMP power processing module 500, according to an example embodiment. The FMP power processing module 500 may be configured to serve as a power transmitter, a power receiver, or both a power transmitter and power receiver. The FMP power processing module 500 includes an AC/DC converter 510 (which is optional or may be selectively invoked), a power transmitter 520, a power receiver 530, a controller 540, a switch 550 coupled between the power transmitter 520 and a send line 560, and a switch 570 coupled between a receive line 580 and the power transmitter 520. One or more sensors 585 are coupled to the send and/or receive lines 560 and 580 to sense voltage and/or current on the send line 560 and/or receive line 580. The controller 540 is coupled to the sensors 585 and to each of the switches 550 and 570. The controller 540 may be a microprocessor or microcontroller that is programmed to analyze the output of the sensor(s) 585 to detect conditions on the send line 560 and/or receive line 580 that are indicative of a fault.

In operation, when the input power is AC power, then the AC/DC converter 510 is invoked to convert the AC power to DC power. The power transmitter 520 generates a power waveform to transmit the power, via switch 550 over send line 560. In one example, the power transmitter 520 may include one or more switches to modulate the DC power into current or voltage pulses. The sensor(s) 585 monitor conditions on the send line 560 and/or receive line 580 to detect voltage or current conditions. The controller 540 obtains the output from the sensor(s) 585 and evaluates the output(s) of the sensor(s) 585 to determine if the voltage or current changes indicate a fault caused by a human touch or contact event, which could potentially harmful. When the controller 540 detects a fault, the controller 540 may cause switch 550 (and optionally switch 560) to open, and thereby disconnect power from the power transmitter from being applied to the send line 560. The power receiver 530 may receive power supplied by a remote device via the send line 560.

Thus, as depicted in FIGS. 1-5, a PDU is provided with field or factory installable variant processing subsystems that enable PoE ports (for environmental monitoring or security), FMP ports (for high efficiency powering of large loads in the rack), or traditional AC power, with optional PLC or single pair Ethernet communications to power legacy loads that do not support FMP/PoE. The FMP configuration could be as a transmitter, or a receiver, or both in the case where a PDU receives FMP and then retransmits FMP to downstream devices.

Figure 6:
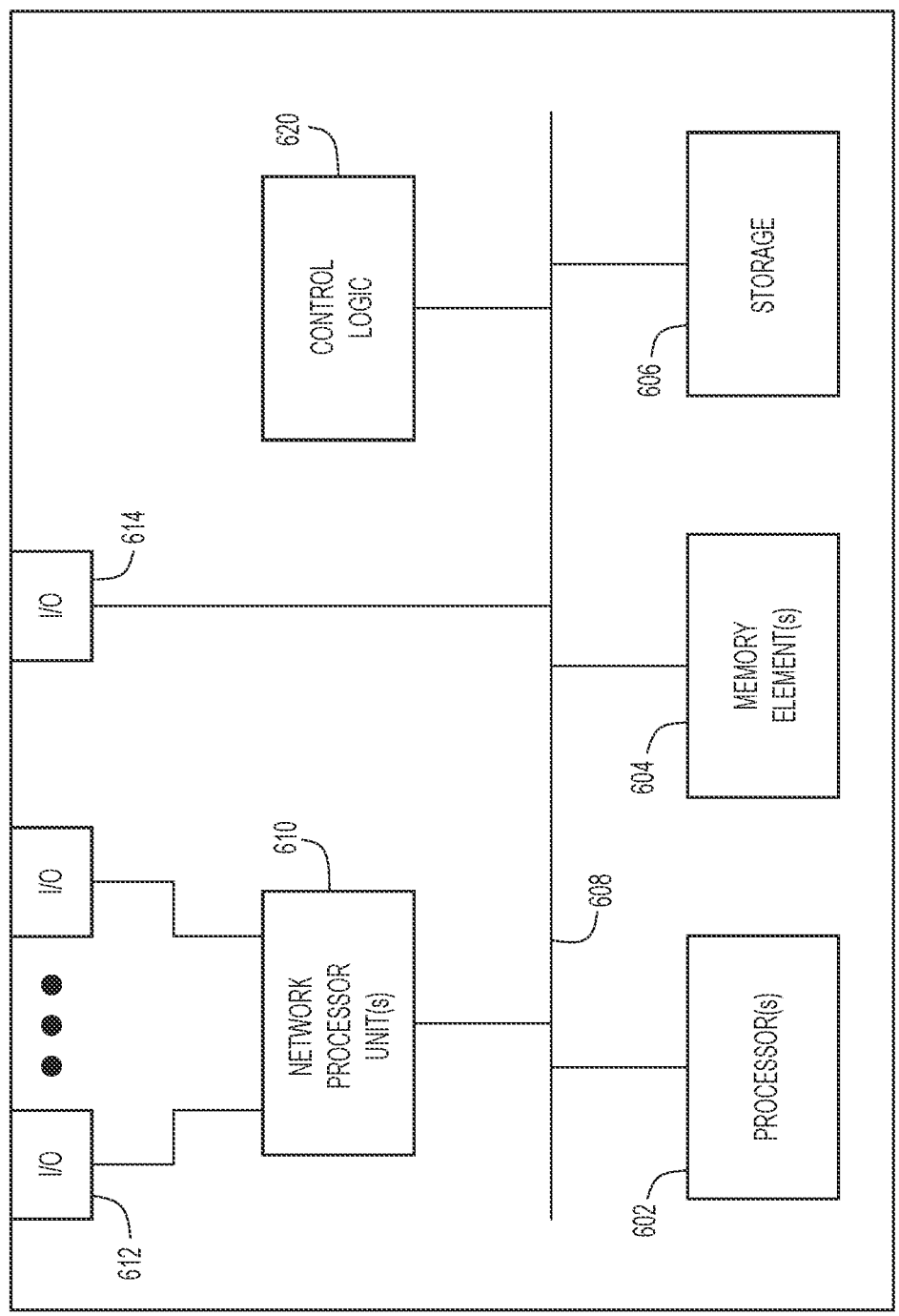
FIG. 6 is a block diagram of a device that may be configured to perform operations of the various embodiments depicted in FIGS. 1-5, according to an example embodiment.

FIG. 6 illustrates a hardware block diagram of a device 600 that may perform functions associated with operations discussed herein in connection with the techniques depicted in FIGS. 1-5.

In at least one embodiment, the device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for device 600 can overlap in any manner and are not limited to the specific allocation of instructions and/or operations described herein.

In at least one embodiment, processor(s) 602 is/are at least one hardware processor configured to execute various tasks, operations and/or functions for device 600 as described herein according to software and/or instructions configured for device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with device 600, and/or logic configured for memory element(s) 604 and/or storage 606. For example, any logic described herein (e.g., control logic 620) can, in various embodiments, be stored for device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of device 600 to communicate in order to exchange information and/or data. Bus 608 can be implemented with any architecture designed for passing control, data and/or information between processors, memory elements/storage, peripheral devices, and/or any other hardware and/or software components that may be configured for device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In some aspects, the techniques described herein relate to a power distribution apparatus including: a housing configured to be mounted into or on a rack that has a plurality of shelf positions; power inputs coupled to the housing, the power inputs configured to receive one or more of: alternating current (AC) power, high voltage direct current (DC) power, single-phase fault managed power, or multi-phase fault managed power; at least one fault managed power module configured to be contained in the housing, the at least one fault managed power module including a power transmitter configured to generate single-phase fault managed power or multi-phase fault managed power from the AC power, the high voltage DC power, the single-phase fault managed power or the multi-phase fault managed power; and a plurality of connectors on the housing and configured to provide cable connections to one or more of the plurality of shelf positions of the rack for one or more of: AC power, high voltage DC power, lower voltage DC power, single-phase fault managed power, or multi-phase fault managed power.

In some aspects, the techniques described herein relate to a power distribution apparatus, wherein the housing is configured to horizontally mount in one of the plurality of shelf positions of the rack.

In some aspects, the techniques described herein relate to a power distribution apparatus, wherein the housing is configured to vertically mount to the rack.

In some aspects, the techniques described herein relate to a power distribution apparatus, further including a bracket configured to attach the housing to the rack, wherein the bracket is configured to rotate or swing outward from the housing.

In some aspects, the techniques described herein relate to a power distribution apparatus, wherein further including a bus bar configured to mount inside the housing and having a plurality of module positions, each module position configured to removably receive a power processing module, wherein the power processing module is configured to generate or output one of: single-phase fault managed power, multi-phase fault managed power, Power-over-Ethernet power and data, high voltage DC power, or AC power.

In some aspects, the techniques described herein relate to a power distribution apparatus, wherein the power processing module is factory or field configurable to generate one of a plurality of power types.

In some aspects, the techniques described herein relate to a power distribution apparatus, wherein at least one power processing module is configured to reduce the high voltage DC power to the lower voltage DC power.

In some aspects, the techniques described herein relate to a power distribution apparatus, further including a data uplink.

In some aspects, the techniques described herein relate to a power distribution apparatus, further including a power module configured to provide AC power and data communications over AC power.

In some aspects, the techniques described herein relate to a power distribution apparatus including: power inputs configured to receive one or more of: alternating current (AC) power, high voltage direct current (DC) power, single-phase fault managed power, or multi-phase fault managed power; a bus bar configured to mount to a rack that has a plurality of shelf positions, the bus bar having a plurality of module positions, each module position configured to removably receive a power processing module, wherein the power processing module is configured to generate or output one of: single-phase fault managed power, multi-phase fault managed power, Power-over-Ethernet power and data, high voltage DC power, or AC power; and a plurality of connectors configured to provide cable connections to one or more of the plurality of shelf positions of the rack for one or more of: AC power, high voltage DC power, lower voltage DC power, single-phase fault managed power, or multi-phase fault managed power.

In some aspects, the techniques described herein relate to a power distribution apparatus, further including a housing that contains the bus bar and is configured to be mounted into or on a rack.

In some aspects, the techniques described herein relate to a power distribution apparatus, wherein the housing is configured to vertically mount to the rack, and further including a bracket configured to attach the housing to the rack, wherein the bracket is configured to rotate or swing outward from the housing.

In some aspects, the techniques described herein relate to a power distribution apparatus, wherein the power processing module is factory or field configurable to generate one of a plurality of power types.

In some aspects, the techniques described herein relate to a power distribution apparatus, wherein at least one power processing module is configured to reduce the high voltage DC power to the lower voltage DC power.

In some aspects, the techniques described herein relate to a power distribution apparatus including: power inputs configured to receive one or more of: alternating current (AC) power, high voltage direct current (DC) power, single-phase fault managed power, or multi-phase fault managed power; a bus bar configured to mount to a rack that has a plurality of shelf positions, the bus bar having a plurality of module positions; a plurality of power processing modules, each power processing module of the plurality of power processing modules configured to generate or output at least one of: single-phase fault managed power, multi-phase fault managed power, Power-over-Ethernet power and data, high voltage DC power, lower voltage DC power or AC power; and a plurality of connectors configured to provide cable connections to one or more of the plurality of shelf positions of the rack for one or more of: AC power, high voltage DC power, lower voltage DC power, single-phase fault managed power, or multi-phase fault managed power.

In some aspects, the techniques described herein relate to a power distribution apparatus, further including a housing that contains the bus bar and is configured to be mounted into or on a rack.

In some aspects, the techniques described herein relate to a power distribution apparatus, wherein the housing is configured to horizontally mount in one of the plurality of shelf positions of the rack.

In some aspects, the techniques described herein relate to a power distribution apparatus, wherein the housing is configured to vertically mount to the rack, and further including a bracket configured to attach the housing to the rack, wherein the bracket is configured to rotate or swing outward from the housing.

In some aspects, the techniques described herein relate to a power distribution apparatus, wherein at least one of the plurality of power processing modules is factory or field configurable to generate one of a plurality of power types.

In some aspects, the techniques described herein relate to a power distribution apparatus, wherein at least one power processing module is configured to reduce the high voltage DC power to the lower voltage DC power.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z'. 'one or more of X. Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A power distribution apparatus comprising:
   a housing configured to be mounted into or on a rack that has a plurality of shelf positions;
   power inputs coupled to the housing, the power inputs configured to receive one or more of: a first alternating current (AC) power, a first direct current (DC) power, a first single-phase fault managed power, or a first multi-phase fault managed power;
   at least one fault managed power module configured to be contained in the housing, the at least one fault managed power module including a power transmitter configured to generate an output of a second single-phase fault managed power or a second multi-phase fault managed power from an input of the one of more of: the first AC power, the first DC power, the first single-phase fault managed power or the first multi-phase fault managed power; and
   a plurality of connectors on the housing and configured to provide cable connections to one or more of the plurality of shelf positions of the rack for one or more of: the second single-phase fault managed power or the second multi-phase fault managed power.

2. The power distribution apparatus of claim 1, wherein the housing is configured to horizontally mount in one of the plurality of shelf positions of the rack.

3. The power distribution apparatus of claim 1, wherein the housing is configured to vertically mount to the rack.

4. The power distribution apparatus of claim 3, further comprising a bracket configured to attach the housing to the rack, wherein the bracket is configured to rotate or swing outward from the housing.

5. The power distribution apparatus of claim 1, further including a bus bar configured to mount inside the housing and having a plurality of module positions, each of the plurality of module positions configured to removably receive a power processing module, wherein the power processing module is configured to generate or output one of a plurality of power types of: the second single-phase fault managed power, the second multi-phase fault managed power, Power-over-Ethernet (PoE) power and data, a second DC power, or a second AC power.

6. The power distribution apparatus of claim 5, wherein the power processing module is factory or field configurable to generate the one of the plurality of power types.

7. The power distribution apparatus of claim 5, wherein at least one of the power processing module is configured to reduce the first DC power of a higher voltage to the second DC power of a lower voltage.

8. The power distribution apparatus of claim 5, further comprising a power module configured to provide AC power and data communications over the second AC power.

9. The power distribution apparatus of claim 1, further comprising a data uplink.

10. A power distribution apparatus comprising:
    power inputs configured to receive one or more of: a first alternating current (AC) power, a first direct current (DC) power, a first single-phase fault managed power, or a first multi-phase fault managed power;
    a bus bar configured to mount to a rack that has a plurality of shelf positions, the bus bar having a plurality of module positions, each of the plurality of module positions configured to removably receive a respective one of a plurality of power processing modules, each of the plurality of power processing modules is configured to generate an output of one of a plurality of power types of: a second single-phase fault managed power, a second multi-phase fault managed power, Power-over-Ethernet (PoE) power and data, a second DC power, or a second AC power from an input of the first AC power, the first DC power, the first single-phase fault managed power, or the first multi-phase fault managed power, each of the plurality of power processing modules of a first type is interchangeable in any of the plurality of module positions with a corresponding one of the plurality of power processing modules of a second type, wherein at least one of the input or the output of the first type of the plurality of power processing modules is different from at least one of the input or the output of the second type of the plurality of power processing modules; and a plurality of connectors configured to provide cable connections to one or more of the plurality of shelf positions of the rack for the one or more of the plurality of power types of: the second AC power, the second DC power, the PoE power and data, the second single-phase fault managed power, or the second multi-phase fault managed power.

11. The power distribution apparatus of claim 10, further comprising a housing that contains the bus bar and is configured to be mounted into or on the rack.

12. The power distribution apparatus of claim 11, wherein the housing is configured to vertically mount to the rack, and further comprising a bracket configured to attach the housing to the rack, wherein the bracket is configured to rotate or swing outward from the housing.

13. The power distribution apparatus of claim 10, wherein at least one of the plurality of power processing modules is factory or field configurable to generate the one of the plurality of power types.

14. The power distribution apparatus of claim 10, wherein at least one of the plurality of power processing modules is configured to reduce the first DC power of a higher voltage to the second DC power of a lower voltage.

15. A power distribution apparatus comprising:
power inputs configured to receive one or more of: a first alternating current (AC) power, a first direct current (DC) power, a first single-phase fault managed power, or a first multi-phase fault managed power;
a bus bar configured to mount to a rack that has a plurality of shelf positions, the bus bar having a plurality of module positions;
a plurality of power processing modules, the plurality of power processing modules comprise a power processing module of a first type and a power processing module of a second type, each power processing module of the first type or the second type configured to generate an output of at least one of a plurality of power types of: a second single-phase fault managed power, a second multi-phase fault managed power, Power-over-Ethernet (PoE) power and data, a second DC power, or a second AC power from an input of the one or more of: the first AC power, the first DC power, the first single-phase fault managed power, or the first multi-phase fault managed power, wherein at least one of the input or the output of the first type of the power processing module is different from at least one of the input or the output of the second type of the power processing module; and a plurality of connectors configured to provide cable connections to one or more of the plurality of shelf positions of the rack for one or more of: the second AC power, the second DC power, the PoE power and data, the second single-phase fault managed power, or the second multi-phase fault managed power.

16. The power distribution apparatus of claim 15, further comprising a housing that contains the bus bar and is configured to be mounted into or on the rack.

17. The power distribution apparatus of claim 16, wherein the housing is configured to horizontally mount in one of the plurality of shelf positions of the rack.

18. The power distribution apparatus of claim 16, wherein the housing is configured to vertically mount to the rack, and further comprising a bracket configured to attach the housing to the rack, wherein the bracket is configured to rotate or swing outward from the housing.

19. The power distribution apparatus of claim 15, wherein at least one of the plurality of power processing modules is factory or field configurable to generate at least one of the plurality of power types.

20. The power distribution apparatus of claim 15, wherein at least one of the plurality of power processing modules is configured to reduce the first DC power of a higher voltage to the second DC power of a lower voltage.

* * * * *